United States Patent

[11] 3,538,803

[72] Inventors Phillip J. Joesph
North Tonwanda;
Paul Rosenthal, Amherst, New York
[21] Appl. No. 813,021
[22] Filed April 3, 1969
[45] Patented Nov. 10, 1970
[73] Assignee Cornell Aeronautical Laboratory, Inc.
Buffalo, New York
a corporation of New York

[54] CAVITATION MACHINING APPARATUS
8 Claims, 2 Drawing Figs.
[52] U.S. Cl. .................................................. 83/701,
83/13, 241/1, 241/46
[51] Int. Cl. ...................................................... B26f 1/26
[50] Field of Search ........................................... 83/13, 53,
177, 701; 241/1, 46, 301; 51/(Super Sonic Digest)

[56] References Cited
UNITED STATES PATENTS
| | | | |
|---|---|---|---|
| 2,580,716 | 1/1952 | Balamuth | 51/(Super Sonic)UX |
| 2,722,498 | 11/1955 | Morrell et al. | 241/1X |
| 3,173,034 | 3/1965 | Dickey et al. | 51/(Super Sonic)UX |

*Primary Examiner*—William S. Lawson
*Attorney*—Allen J. Jaffe

ABSTRACT: A cavitation machining apparatus contained in a hemispherical shell, a high-pressure liquid environment; ultrasonic transducers attached to the interior of the shell, the ultrasonic waves emanating from which being focused at a common point; and a container for delivering small nonwetting particles adjacent said common point.

Patented Nov. 10, 1970

INVENTOR
PHILLIP J. JOSEPH.
PAUL ROSENTHAL.

BY *Allen J. Jaffe*

ATTORNEY

CAVITATION MACHINING APPARATUS

BACKGROUND OF THE INVENTION

The present invention relates to machining or material removal techniques and, more particularly, to material removal by controlled cavitation erosion. As used herein the term "cavitation machining" is applicable to any material removal process that is based on intensifying and controlling what is usually called cavitation "damage".

There are many situations where environmental or other conditions preclude the application of conventional machining processes. For example, certain materials exhibiting high strength, hardness or brittleness cannot be effectively machined by traditional techniques. Certain nonconventional techniques have been developed, among which are; chemical machining, electrochemical machining and electrodischarge machining. Other types of machining applications require some form of contact with the material to be machined and, therefore, are not suitable in situations where extreme delicacy is required. Such delicacy would be required, for example, in deep sea salvage operations involving explosives.

In addition, at extreme sea depths conventional under water flame cutting is rendered difficult if not impossible due to the inability to sustain a torch at high pressures.

SUMMARY OF THE INVENTION

The foregoing as well as other disadvantages are overcome according to the principles of the present invention which provides an apparatus for machining which intensifies and controls the cavitation erosion processes of the material to be machined.

Cavitation is a phenomenon characterized by the rapid or violent formation of vapor cavities or bubbles in a region of a liquid subjected to very low pressure. Material damage or cavitation erosion occurs as the result of the shock waves developed when the cavitation bubbles collapse. The shock impacts lead to material removal by fracture for brittle materials and fatigue failure for ductile materials.

Cavitation in ordinary liquid, such as water, under normal conditions of pressure and gas content would not lead to material removal rates high enough to be useful. By increasing the frequency and magnitude of collapse pressures the intensity of the cavitation bubble growth and collapse process is increased whereby material removal rates are increased.

Cavitation can occur in both the gaseous and vaporous form. Only vaporous cavitation can lead to high material erosion rates. Gaseous cavitation occurs when the liquid contains dissolved gas and as a result the bubbles contain mostly gas and do not collapse violently since the high gas content has a cushioning effect. As a consequence pure gaseous cavitation does not cause much material erosion. On the other hand, vaporous cavitation which predominates in those cases where the liquid has a low gas content is characterized by rapid and violent bubble collapses which generate the local shock waves responsible for most cavitation erosion effects.

Vaporous cavitation carried out as a controlled material removal process can be greatly enhanced by using degassed fluid under high hydrostatic pressure and with the introduction of artificial nuclei. High hydrostatic fluid pressure will allow higher bubble energy densities and correspondingly higher collapse pressures. However, at these higher fluid pressures the liquid is substantially denucleated, that is, the minute bubbles of gas associated with microscopic dust particles always present in even the purest of liquid will be forced into solution at these high pressures. Cavitation would be difficult to achieve in the absence of these nuclei. To facilitate cavitation at these high pressures lyophobic (nonwetting) colloids of the proper size are added to the liquid. The introduction of such artificial nuclei in addition to introducing voids of known size also enables control of the cavitation bubble population.

Cavitation is induced on the surface of an immersed workpiece by means of rapid pressure fluctuations set up by intense ultrasonic waves.

Basically the present invention provides an open cavitation chamber adapted to operate in liquid at a high hydrostatic pressure, a plurality of transducers configured to generate high frequency ultrasonic waves which converge in the vicinity of a workpiece; and means for supplying lyophobic nuclei particles adjacent the workpiece.

BRIEF DESCRIPTION OF THE DRAWINGS

For a fuller understanding of the present invention reference should now be had to the following detailed description of the same taken in conjunction with the accompanying drawings wherein.

DESCRIPTION OF THE PREFERRED EMBODIMENTS

Figure 1:
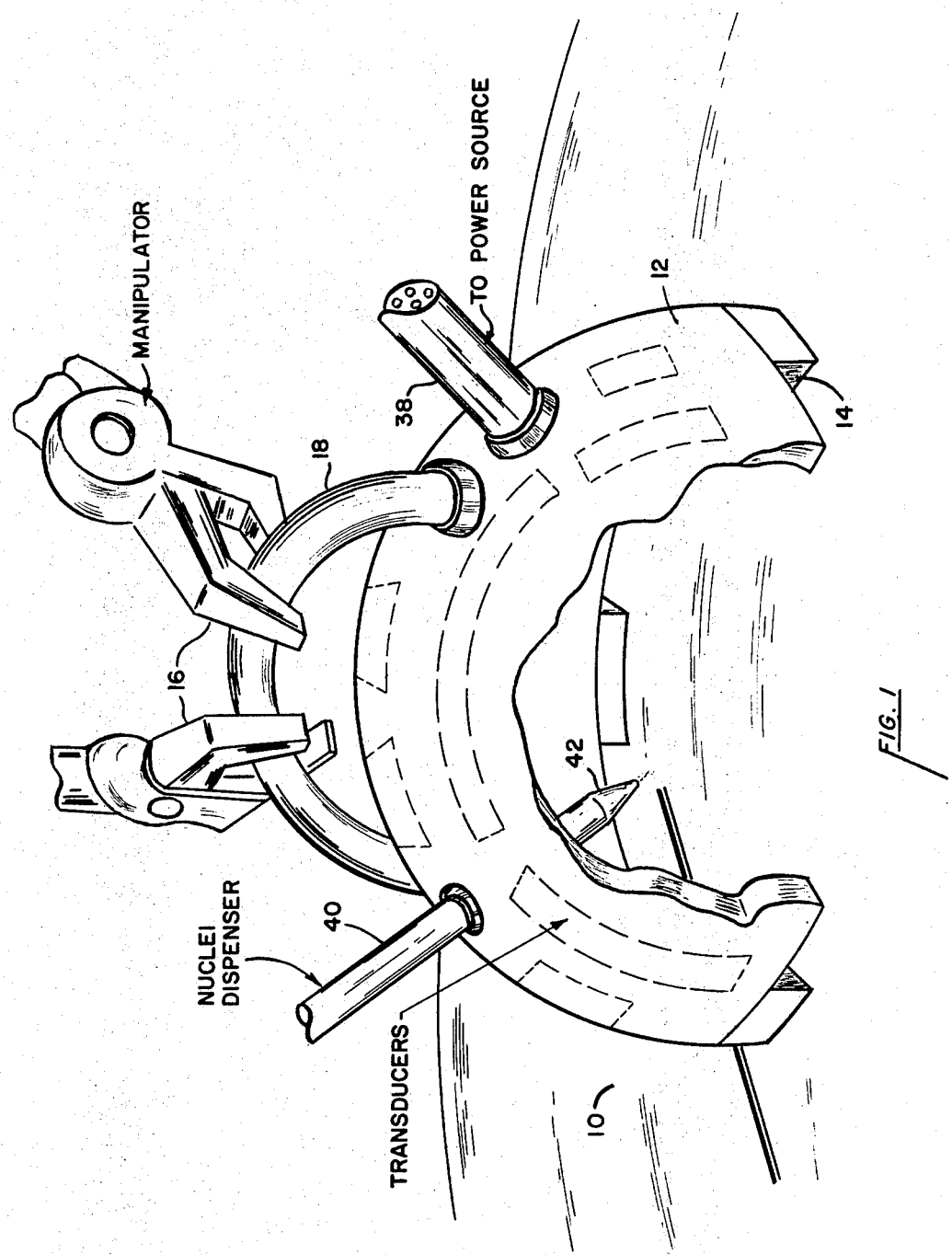
FIG. 1 is a pictorial representation of the cavitation machining apparatus of the present invention as applied to an undersea workpiece.

Referring now to the drawings and, more particularly, to FIG. 1 the cavitation machining apparatus is depicted in an undersea environment and is adapted to perform a cutting or scoring operation on a workpiece 10, which might be the hull of a submerged ship or the like.

A substantially hemispherical shell 12 is adapted to rest on the workpiece 10 by means of projecting legs 14, which are so spaced as to allow communication between the exterior and interior of the shell 12. Shell 12 may be fabricated of any suitable material such as steel. The shell 12 is adapted to slide along the submerged workpiece 10 as the cutting operation progresses. To this end, any manipulator suitable for service in the high-pressure liquid environment may be provided. Shown schematically in FIG. 1 is a pair of grips 16 of such a manipulator cooperating with a handle 18 on the shell.

Figure 2:
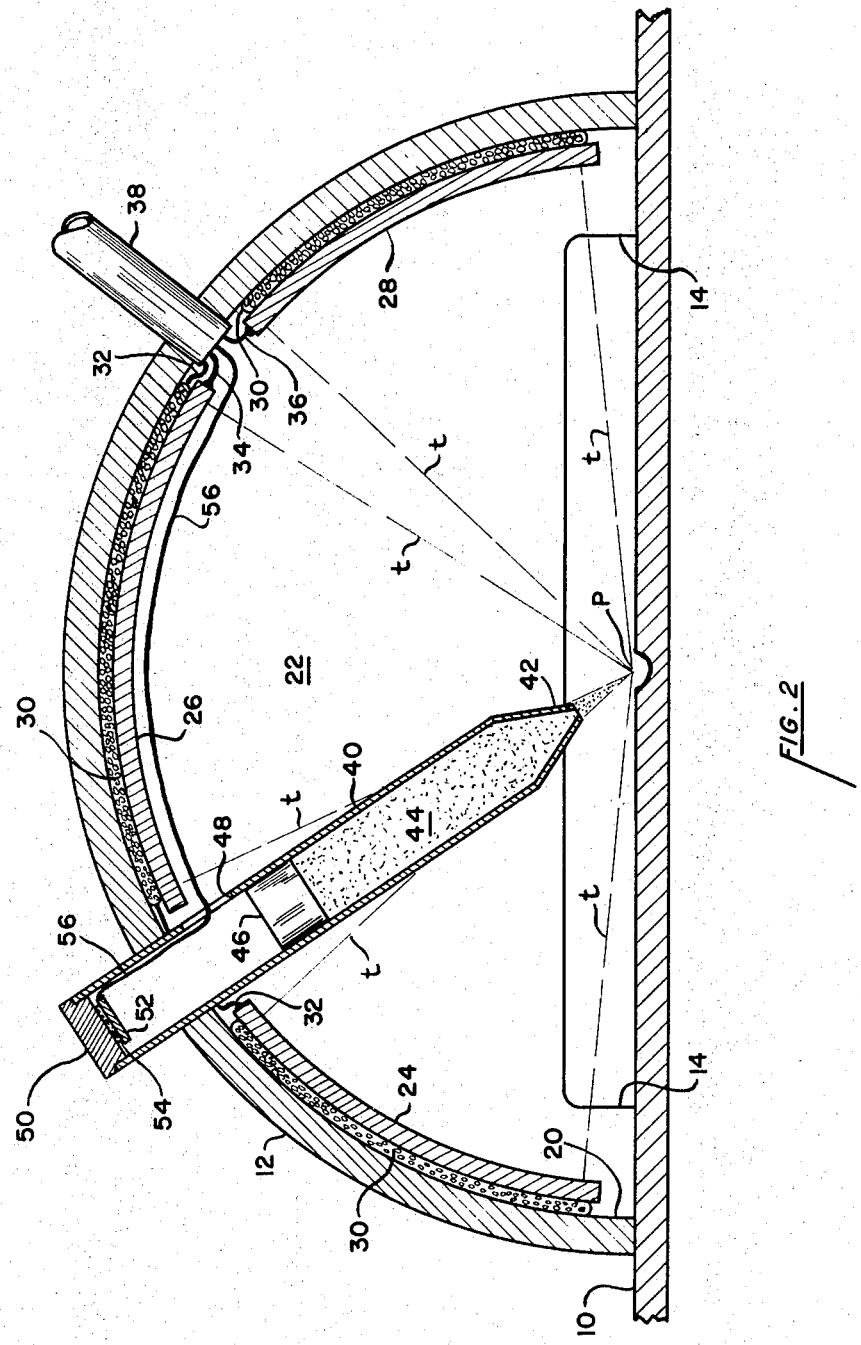
FIG. 2 is a sectional view of the apparatus illustrated in FIG. 1.

As shown in FIG. 2 the interior hemispherical surface 20 of shell 12 defines the bounds of a cavitation chamber 22. Mounted on surface 20 is hemispherical mosaic transducer array, the individual transducers of which are depicted schematically at 24, 26 and 28. The transducers are preferably of a piezoelectric material such as lead zirconate or lead titanate and are affixed to wall 20 by means of a suitable sound-absorbent material such as closed cell sponges 30. Alternatively, silicon rubber can be used. The transducers are connected to a suitable power supply (not illustrated) via leads 32, 34 and 36 and conduit 38. Any conventional power supply can be utilized that is capable of symmetrically loading the transducers to vibrate in the half-wave resonant thickness mode. A typical power supply would have the following capabilities; 60 kc. pulsed signal output carrier frequency; 20 msec. pulse length; 5 pulses per second repitition frequency; peak power of 30 kw.; average power of 3 kw. and an output voltage of less than 100 volts. The driving frequency of the transducers can be up to $10^7$ Hz.

The transducers are arranged and so phased such that the ultrasonic waves emanating therefrom are focused on the workpiece at the area P to be cut or scored. The paths of several of these waves are depicted at the broken lines $t$.

A nuclei material dispenser in the form of a cylindrical tube 40 terminating in a tapered open ended tip 42 is inserted through an opening in shell 12 with the tip located adjacent the workpiece P, the focal point of the ultrasonic waves. Particles 44 of a suitable nonwetting material are contained within tube 40 and are compacted towards tip 42 by means of a piston member 46 slidable within the tube. Tube 40 has a lateral port 48 to allow the hydrostatic pressure acting on piston 46 to equal that of chamber 22. The end of tube 40 remote from tip 42 is located exteriorly of shell 12 and is closed by a cap 50 removably affixed thereto. A transducer 52 similar to those previously described is fixed to cap 50 by means of a suitable sound-absorbent material 54, which may be a closed cell sponge. Lead 56 from the transducer is connected to the power supply through conduit 38 for the excitation thereof. This transducer functions to vibrate piston 46 by ultrasonic waves which causes a supply of nuclei 44 to be dispensed adjacent the workpiece as is shown. Any other suitable means for dispensing the particles from the tube 40 may be utilized.

In operation, the shell 12 is located on top of workpiece 10 at a submerged depth whereat the hydrostatic pressure is sufficiently high that the liquid is substantially degassed. Such condition can occur at depths of 10,000 feet or more. Actuation of transducer 52 generates ultrasonic waves which cause piston 46 to vibrate causing a supply of nuclei material 44 to be dispensed adjacent the workpiece. The actuation of transducers 24, 26 and 28 generates intense ultrasonic waves $t$ which, due to the curved shape of these transducers, are focused or reinforced at P, the area where material is to be removed. The lyophobic particles 44 arriving at point P form the nuclei for bubbles of optimum size which causes the fluid to cavitate in response to the rapid pressure fluctuations set up at P by the intense ultrasonic waves. The collapse of the bubbles create shock waves which upon impact with the workpiece, cause material to be eroded away therefrom at point P. Shell 12 can then be moved to extend the line of cut as shown in FIG. 1. Since the transducers vibrate radially outwardly as well as radially inwardly the material 30 functions to absorb the radially outward waves.

It is believed that nonwetting particles 44 whose molecular structure is different from that of the liquid behave as weak spots in the liquid due to the weak intermolecular linkages existing at the liquid-solid interfaces. The ultrasonic waves set up alternate tension and compression fluctuations. During the tension cycle voids or bubbles are created at the weak liquid-solid interface, which voids or bubbles collapse violently upon the compression cycle of the fluctuating ultrasonic waves. This violent collapse is accompanied by intense shock waves which cause the erosion as discussed above.

Any suitable nonwetting (lyophobic) material in colloidal form can be utilized in container 40. Examples of such material are metals such as gold, hydrocarbon compounds such as latex, or ceramic colloidal compounds. Since the mechanism of bubble growth and collapse at any transducer frequency and pressure depends on the size of the bubble nuclei, it is possible to control and optimize the cavitation process by use of properly sized material in container 40. At the operating conditions noted above and at a pressure of $10^4$ atmosphere it has been determined that particle sizes of less than $33 \times 10^{-6}$ meters would produce satisfactory results.

Although the foregoing description has related to underwater machining, it is possible to utilize similar apparatus for special machining or scoring operations on land. In which case shell 12 would have to be sealed and means would be provided to deliver thereto a supply of substantially degassed fluid at high hydrostatic pressures. Also, the walls of the shell would have to be made strong enough to withstand the high internal pressure.

Although a preferred embodiment of the invention has been described, changes will occur to those skilled in the art. Therefore, it is intended that the invention is to be limited only by the scope of the appended claims.

We claim:
1. A cavitation machining apparatus, comprising:
   a. a cavitation chamber adapted to contain liquid at a high hydrostatic pressure;
   b. means located within said chamber for generating high frequency sound waves converging at a focal point; and
   c. means for supplying small particles of a lyophobic material adjacent said focal point.
2. The apparatus according to claim 1, wherein:
   d. said cavitation chamber comprises a generally hemispherical shell; and
   e. said first-mentioned means comprise a plurality of ultrasonic transducers generally conforming in shape to the interior of said hemispherical shell.
3. The apparatus according to claim 2, wherein:
   f. said means for supplying comprises a container having an outlet opening adjacent said focal point, and there is further provided within said container;
   g. an ultrasonic transducer adapted to vibrate and cause the ejection of the particles within said container.
4. The apparatus according to claim 1, wherein:
   d. said first-mentioned means comprise a plurality of ultrasonic transducers; and
   e. said means for supplying comprises a container having an outlet opening adjacent said focal point.
5. The apparatus according to claim 4, wherein:
   f. the interior of said cavitation chamber is substantially spherical in shape, the center of which coincides with said focal point; and
   g. said ultrasonic transducers are curved to conform to the contour of the interior of said chamber, the center of curvature of which coincides with the center of said sphere and said focal point.
6. The apparatus according to claim 5, further comprising:
   h. small particles of a lyophobic material located in said container.
7. The apparatus according to claim 6, wherein:
   i. said transducers are affixed to the interior of said cavitation chamber, and there is further provided;
   j. a sound absorbing material between said transducers and the interior of said chamber.
8. The apparatus according to claim 7, further comprising:
   k. an ultrasonic transducer located within said container for vibrating said small particles.